US006595834B2

(12) United States Patent
Retherford et al.

(10) Patent No.: US 6,595,834 B2
(45) Date of Patent: Jul. 22, 2003

(54) METHOD OF MAKING <200NM LIGHT TRANSMITTING OPTICAL FLUORIDE CRYSTALS FOR TRANSMITTING LESS THAN 200NM LIGHT

(75) Inventors: Rebecca S. Retherford, Coudersport, PA (US); Robert Sabia, Corning, NY (US); Vincent P. Sokira, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/911,153

(22) Filed: Jul. 23, 2001

(65) Prior Publication Data

US 2003/0045097 A1 Mar. 6, 2003

Related U.S. Application Data

(63) Continuation-in-part of application No. 09/587,830, filed on Jun. 6, 2000, now Pat. No. 6,375,551.
(60) Provisional application No. 60/141,140, filed on Jun. 25, 1999.

(51) Int. Cl.[7] .................................................. B24B 1/00
(52) U.S. Cl. ............................. 451/41; 451/42; 451/37
(58) Field of Search ............................. 451/41, 42, 37, 451/36, 285, 287, 28

(56) References Cited

U.S. PATENT DOCUMENTS

| | | | | |
|---|---|---|---|---|
| 5,776,219 A | * | 7/1998 | Jinbo et al. | 65/31 |
| 6,099,389 A | * | 8/2000 | Nichols et al. | 451/36 |
| 6,375,551 B1 | * | 4/2002 | Darcangelo et al. | 451/41 |

FOREIGN PATENT DOCUMENTS

| | | |
|---|---|---|
| EP | 0 846 741 A1 | 6/1998 |
| EP | 1 088 789 A2 | 4/2001 |
| JP | 11-087808 | 3/1999 |
| WO | WO 01/39260 A1 | 5/2001 |

OTHER PUBLICATIONS

"Performance Characterization of Cerium Oxide Abrasives for Chemical–Mechanical Polishing of Glass," Sabia et al., *Mach Sci & Tech*, 4(2), 2000, pp. 235–251.

(List continued on next page.)

*Primary Examiner*—Robert A. Rose
(74) *Attorney, Agent, or Firm*—Edward M. Murphy; Walter M. Douglas

(57) ABSTRACT

The invention relates to optical fluoride crystals, and particularly to optical fluoride crystals such as calcium fluoride, which have high transmission levels to below 200 nm light, such as produced by excimer lasers. In particular the invention relates to making optical fluoride crystals with improved transmission surfaces. The invention relates to the elimination of mid-spatial frequency roughness 1–1000 μm spatial wavelengths and high-spatial frequency<1 μm spatial wavelengths from optical fluoride crystal surfaces. The removal of the mid-spatial frequency 1–1000 μm spatial wavelengths and high-spatial frequency<1 μm spatial wavelengths from the optical fluoride crystal surfaces provides improved transmission at below 200 nm optical lithography wavelengths such as 193 nm and 157 nm. The invention includes final finished optical fluoride crystals having final finish high optical transmission surfaces free of mid-spatial frequency roughness 1–1000 μm spatial wavelengths and high-spatial frequency roughness<1 μm spatial wavelengths with high transmission at λ<200 nm.

58 Claims, 17 Drawing Sheets

OTHER PUBLICATIONS

"Anisotropy in the Hardness and Friction of Calcium Fluoride Crystals," O'Neill, J.B. et al., *Jour Matl Sci*, 8 (1973), pp. 47–58.

"Laser Damage and Ablation of Diffently Prepared $CaF_2$ (111) Surfaces," Reichling, M. et al., *Czech Jour Phys*, vol. 49 (1999), No. 12, pp 1737–1742.

"Excimer–laser–induced Degradation of Fused Silica and Calcium Fluoride for 193–nm Litho–graphic Applications," Liberman, V. et al., *Opt Ltrs*, vol. 24, No. 1, Jan. 1, 1999, pp 58–60.

"Effect of the Anisotropy of Physical and Mechanical Properties of Fluorite Crystals on the Shape Accuracy of a Polished Surface," Kukleva, Z.A., et al., *Sov Jour Opt Tech*, 49(4), Apr. 1982, pp 227–230.

"Laser Damage of Alkaline–Earth Fluorides at 248 nm and the Influence of Polishing Grades," Stenzel, E., et al., *Applied Surf Sci*, 109/110 (1997), pp 162–167.

"Chemical and Mechanical Techniques for Polishing Glass," Sabia, R. et al., *The Glass Res*, vol. 9, No. 1, p. 21.

* cited by examiner

METHOD OF MAKING <200NM LIGHT TRANSMITTING OPTICAL FLUORIDE CRYSTALS FOR TRANSMITTING LESS THAN 200NM LIGHT

This application is a continuation-in-part of U.S. patent application Ser. No. 09/587,830 filed Jun. 6, 2000, now U.S. Pat. No. 6,375,551, granted Apr. 23, 2002, entitled ANGSTROM POLISHING OF CALCIUM FLUORIDE OPTICAL VUV MICROLITHOGRAPHY LENS ELEMENTS AND PREFORMS, priority to which is hereby claimed, and priority is hereby claimed to U.S. Provisional Application No. 60/141,140 filed on Jun. 25,1999.

FIELD OF THE INVENTION

The invention relates to optical fluoride crystals, and particularly to optical fluoride crystals such as calcium fluoride, which have high transmission levels to below 200 nm light, such as produced by excimer lasers. In particular the invention relates to making optical fluoride crystals with improved transmission surfaces. The invention relates to the elimination of mid-spatial frequency roughness 1–1000 μm spatial wavelengths and high-spatial frequency<1 μm spatial wavelengths from optical fluoride crystal surfaces.

BACKGROUND

Applications of colloidal suspensions for polishing materials has become an exceedingly critical aspect of the final part formation of optical element components and blanks thereof. Silica and alumina colloids are formed through various techniques and typically require expensive precursor materials in order to ensure the highest purity products. Solutions are stabilized with buffer systems to pH and solids loading values that result in optimal surface finish attainment. Particle size distribution can be adjusted to control the final surface finish, as well as the ability to clean residue abrasive particles from workpiece surfaces after processing.

The level of final optical transmission surfaces currently available for optical fluoride crystals is not good enough for optical fluoride crystalline laser components and optical lithography elements.

SUMMARY OF INVENTION

The invention includes a method of making a wavelength λ<200 nm optical fluoride crystal with the method including providing a fluoride crystal preform having a first and a second initial finished optical transmission surfaces having a ≦20 angstrom RMS surface roughness with a plurality of initial finished mid-spatial frequency roughness 1–1000 μm spatial wavelengths and initial finished high-spatial frequency roughness<1 μm spatial wavelengths and the initial finished fluoride preform having a low initial finish λ<200 nm transmission LT (%/cm). The method includes providing a final polishing mid-spatial frequency and high-spatial frequency spatial wavelength removing colloidal particle solution having a pH≧9 and a plurality of colloidal particles and final polishing the initial finished surfaces with the mid-spatial frequency and high-spatial frequency spatial wavelength removing solution into first and second final polished calcium fluoride optical transmission surfaces with the mid-spatial frequency and high-spatial frequency spatial wavelength removing solution removing the initial finished spatial frequency spatial wavelengths to provide a final finished optical fluoride crystal having final finish high optical transmission surfaces free of the mid-spatial frequency roughness 1–1000 μm spatial wavelengths and the high-spatial frequency roughness<1 μm spatial wavelengths with a λ<200 nm high transmission HT (%/cm), with HT>LT, and transmitting a final use wavelength λ<200 nm light through the final finish high optical transmission surfaces.

The invention includes a method of making a <200 nm light transmitting optical fluoride crystal blank for transmitting less than 200 m light at a fluence less than 20 J/cm$^2$. The method includes providing an optical fluoride crystal preform having a first and second initial finished parallel flat optical transmission surfaces having a ≦50 angstrom RMS surface roughness with an initial finished mid-spatial frequency (1–1000 μm spatial wavelength) roughness and an initial finished high-spatial frequency (<1 μm spatial wavelength) roughness, with the initial finished preform having a low initial finish λ<200 nm transmission LT (%/cm). The method includes providing a final surface processing colloidal non-friable spherical abrasive particle solution having a pH≧9 and a plurality of colloidal non-friable spherical abrasive particles which have a mean particle size in the range from 20 to 300 nm. The method includes final polishing the initial finished surfaces with the final surface processing colloidal particle solution into a final polished optical transmission surface with the final polishing final surface processing colloidal particle solution removing the initial finished mid-spatial frequency roughness spatial wavelengths of 1–1000 μm and the initial finished high-spatial frequency roughness spatial wavelengths<1 μm to provide a final finished optical fluoride crystal blank having a final finish high optical transmission surface with a final finish λ<200 nm high transmission HT (%/cm) with HT>LT.

The invention includes a method of making an ultraviolet λ<200 nm qualified optical fluoride crystal qualified for use at a wavelength λ<200 nm, and preferably at a fluence<20 J/cm$^2$ at the less than 200 nm wavelength λ. The method comprises providing an optical fluoride crystal preform having a first initial finished flat optical transmission surface with a ≦50 angstrom RMS surface roughness with initial finished mid-spatial frequency roughness with 1–1000 μm spatial wavelengths and initial finished high-spatial frequency roughness with <1 μm spatial wavelengths, and the preform having a low initial finish λ<200 nm transmission LT (%/cm). The method includes providing a final polishing mid-spatial frequency removing colloidal spherical abrasive particle solution, with the mid-spatial frequency removing solution having a pH≧9, a plurality of colloidal particles having a mean particle size in the range from 20 to 300 nm, preferably with the particles comprised of $SiO_2$. The method includes final polishing the initial finished surface with the mid and high spatial frequency removing solution into a final polished optical transmission surface with the mid-spatial frequency and high-spatial frequency removing solution removing the initial finished mid-spatial frequency roughness 1–1000 μm spatial wavelengths and the initial finished high-spatial frequency roughness<1 μm spatial wavelengths to provide a final finished optical fluoride crystal having a final finish high optical transmission surface with a final finish λ<200 nm high transmission HT (%/cm) with HT>LT and transmitting a final use wavelength λ<200 nm light beam with a fluence<20 J/cm$^2$ through the final finish high optical transmission surfaces to provide a qualifying optical transmission measurement for said wavelength λ<200 nm.

The invention includes a method of making a wavelength λ<200 nm optical calcium fluoride crystal for use at fluences<20 J/cm$^2$. The method includes providing a calcium fluoride crystal preform having a first and second initial finished flat optical transmission surfaces which have ≦50 angstrom RMS surface roughness with an initial finished mid-spatial frequency roughness 1–1000 μm spatial wavelengths and an initial finished high-spatial frequency roughness<1 μm spatial wavelengths, and the initial finished calcium fluoride preform having a low initial finish λ<200 nm transmission LT (%/cm). The method includes providing a final polishing mid-spatial frequency and high-spatial frequency removing colloidal $SiO_2$ particle solution having a pH≧9 and a plurality of colloidal $SiO_2$ particles with a mean particle size in the range from 20 to 300 nm. The method includes final polishing the initial finished surfaces with the mid-spatial frequency and high-spatial frequency removing solution into first and second final polished calcium fluoride optical transmission surfaces with the spatial frequency removing solution removing the initial finished spatial frequency wavelengths to provide a final finished optical calcium fluoride crystal having final finish high optical transmission surfaces with a λ<200 nm high transmission HT (%/cm) with HT>LT. The method includes transmitting a final use wavelength λ<200 nm light beam with a fluence<20 J/$cm^2$ through the final finish high optical transmission surfaces to provide a qualifying optical transmission measurement for the λL<200 nm wavelength.

The invention includes a method of making a wavelength λ<200 nm optical calcium fluoride crystal with the method including providing a calcium fluoride crystal preform having a first and a second initial finished optical transmission surfaces having a ≦20 angstrom RMS surface roughness with a plurality of initial finished mid-spatial frequency roughness 1–1000 μm spatial wavelengths and initial finished high-spatial frequency roughness<1 μm spatial wavelengths and the initial finished calcium fluoride preform having a low initial finish λ<200 nm transmission LT (%/cm). The method includes providing a final polishing mid-spatial frequency and high-spatial frequency spatial wavelength removing colloidal particle solution having a pH≧9 and a plurality of colloidal particles and final polishing the initial finished surfaces with the mid-spatial frequency and high-spatial frequency spatial wavelength removing solution into first and second final polished calcium fluoride optical transmission surfaces with the mid-spatial frequency and high-spatial frequency spatial wavelength removing solution removing the initial finished spatial frequency spatial wavelengths to provide a final finished optical calcium fluoride crystal having final finish high optical transmission surfaces free of the mid-spatial frequency roughness 1–1000 μm spatial wavelengths and the high-spatial frequency roughness<1 μm spatial wavelengths with a λ<200 nm high transmission HT (%/cm), with HT>LT, and transmitting a final use wavelength λ<200 nm light through the final finish high optical transmission surfaces.

DESCRIPTION OF THE DRAWINGS

FIG. 15 optical interferometry images were recorded at 5× magnification with a scan area of 1.48 $mm^2$. Image FIG. 15(*a*) shows a surface quality of Ra=1.58 nm, RMS=2.00 nm, and Rt=17.63 nm, and image FIG. 15(*b*) shows a surface quality of Ra=1.21 nm, RMS=1.52 nm, and Rt=11.90 nm.

FIG. 16 optical interferometry images were recorded at 40× magnification with a scan area of 0.023 $mm^2$. Image FIG. 16(*a*) shows a surface quality of Ra=1.05 nm, RMS=1.29 nm, and Rt=9.58 nm, and image FIG. 16(*b*) shows a surface quality of Ra=0.64 nm, RMS=0.82 nm, and Rt=6.76 nm.

DETAILED DESCRIPTION OF THE INVENTION

Figure 1:
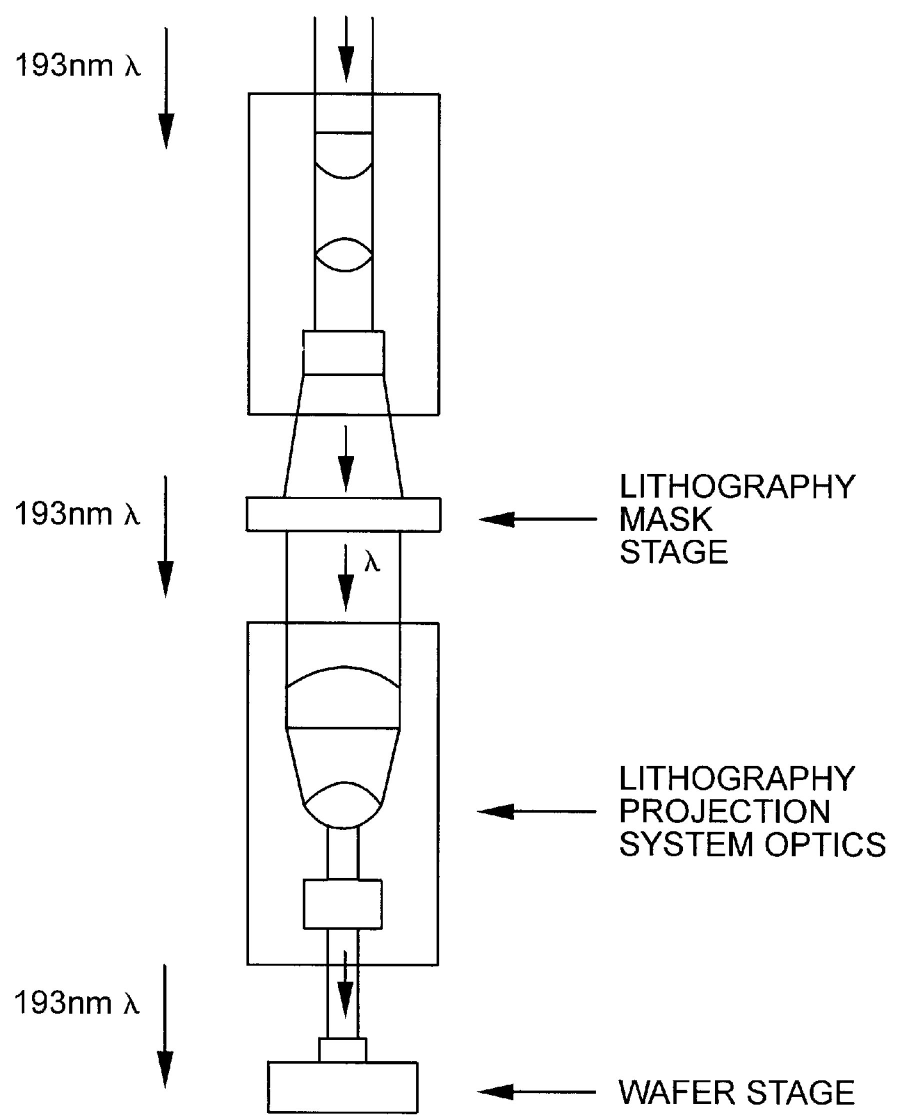
FIG. 1 illustrates <200 nm lithography and laser optical element embodiments in accordance with the invention.
Figure 2:
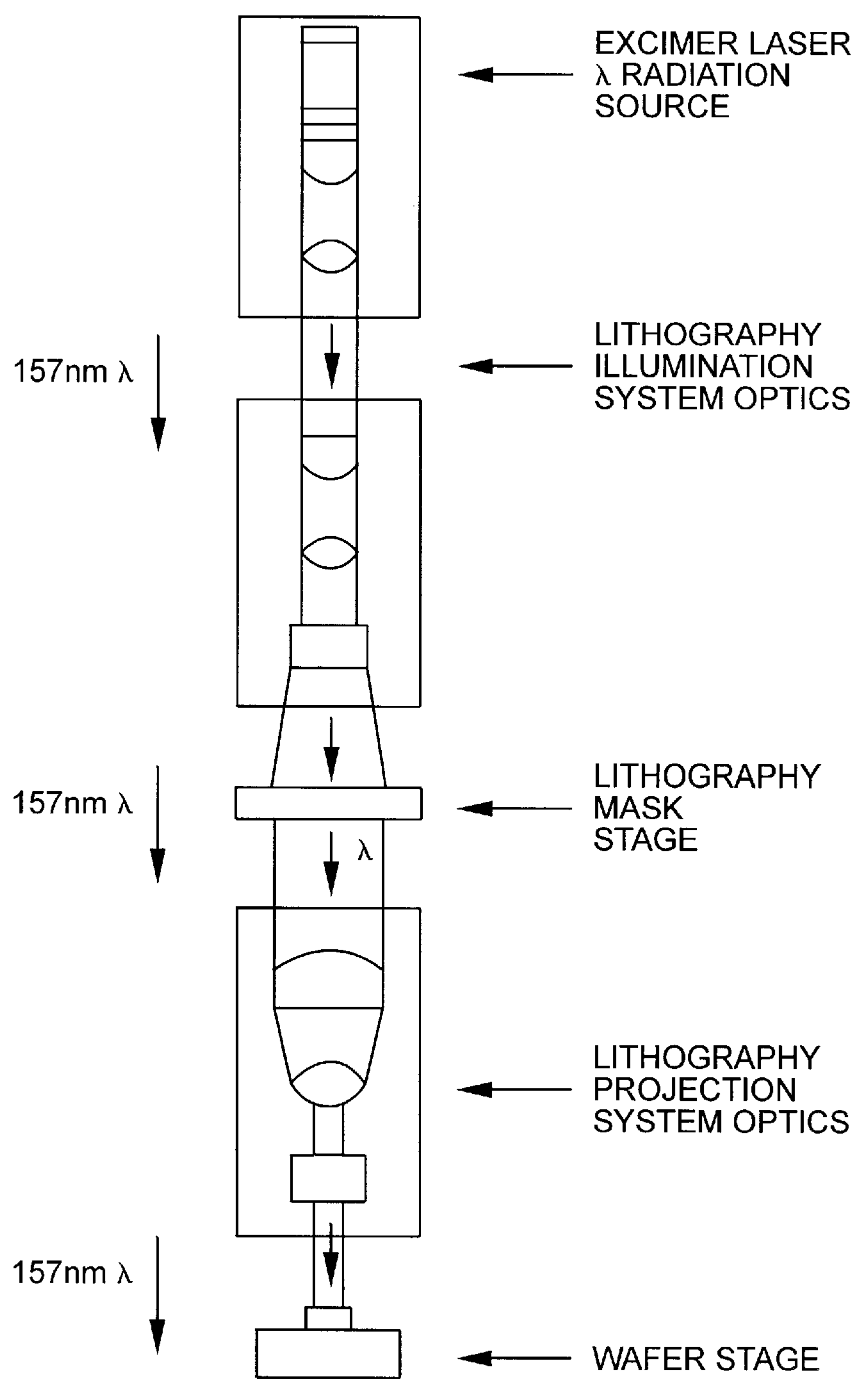
FIG. 2 illustrates <200 nm lithography and laser optical element embodiments in accordance with the invention.

The invention includes making <200 nm light transmitting optical fluoride crystal for transmitting less than 200 nm light, preferably at a fluence less than 20 J/$cm^2$. Such <200 nm light transmitting optical fluoride crystals are utilized in VUV optical lithography systems and lasers which operate at wavelengths less than 200 nm. FIG. 1 shows such a 193 nm lithography system/excimer laser which utilizes <200 nm optical fluoride crystals and FIG. 2 shows a 157 nm lithography system/excimer laser which utilizes <200 nm optical fluoride crystals.

Figure 3:
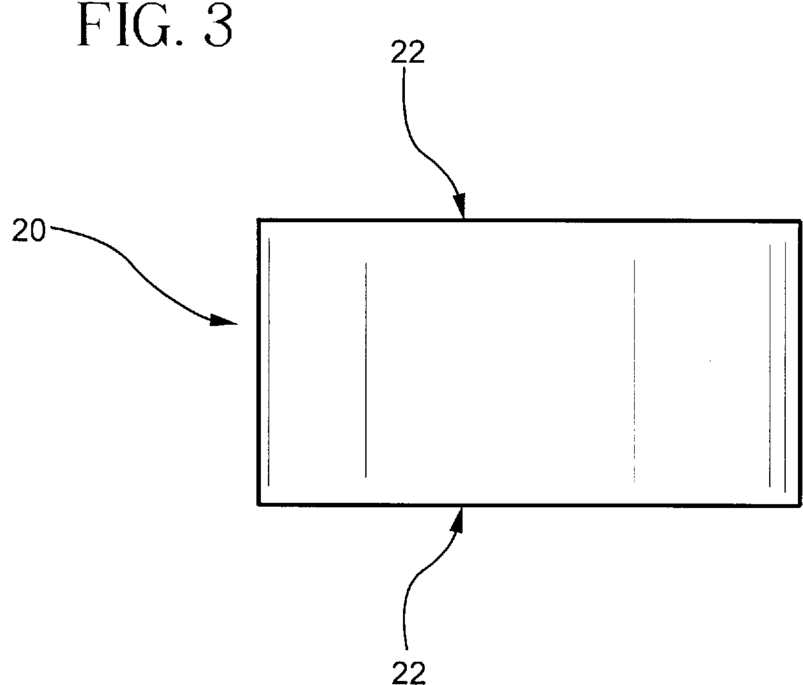
FIGS. 3–14 illustrate methods in accordance with the invention.
Figure 4:
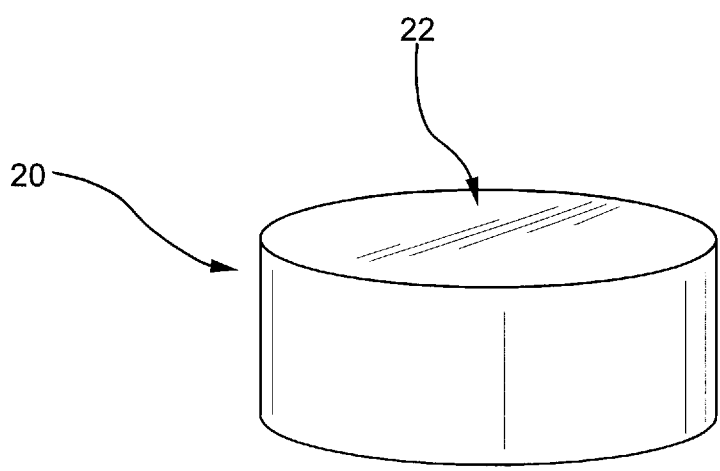
Figure 5:
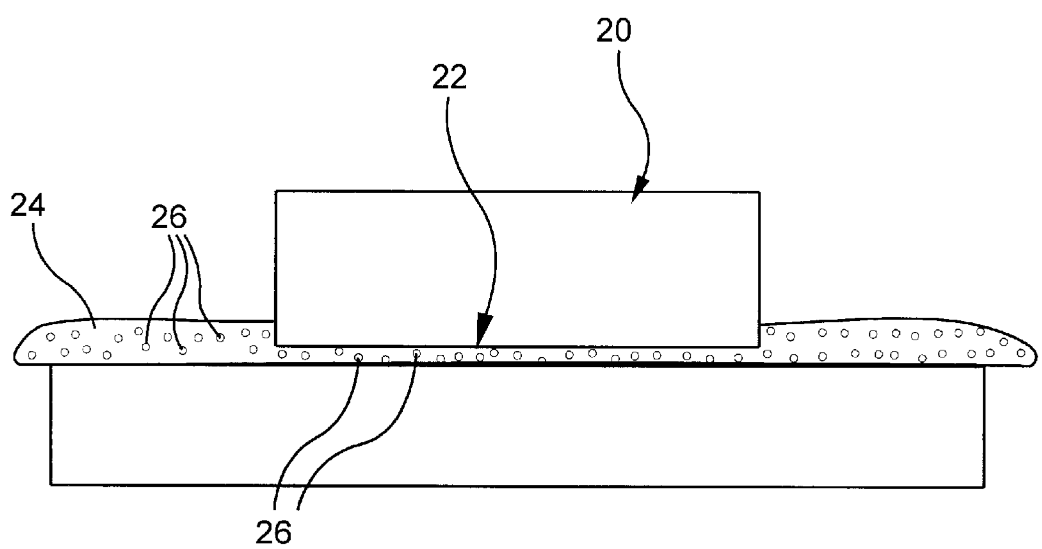
Figure 6:
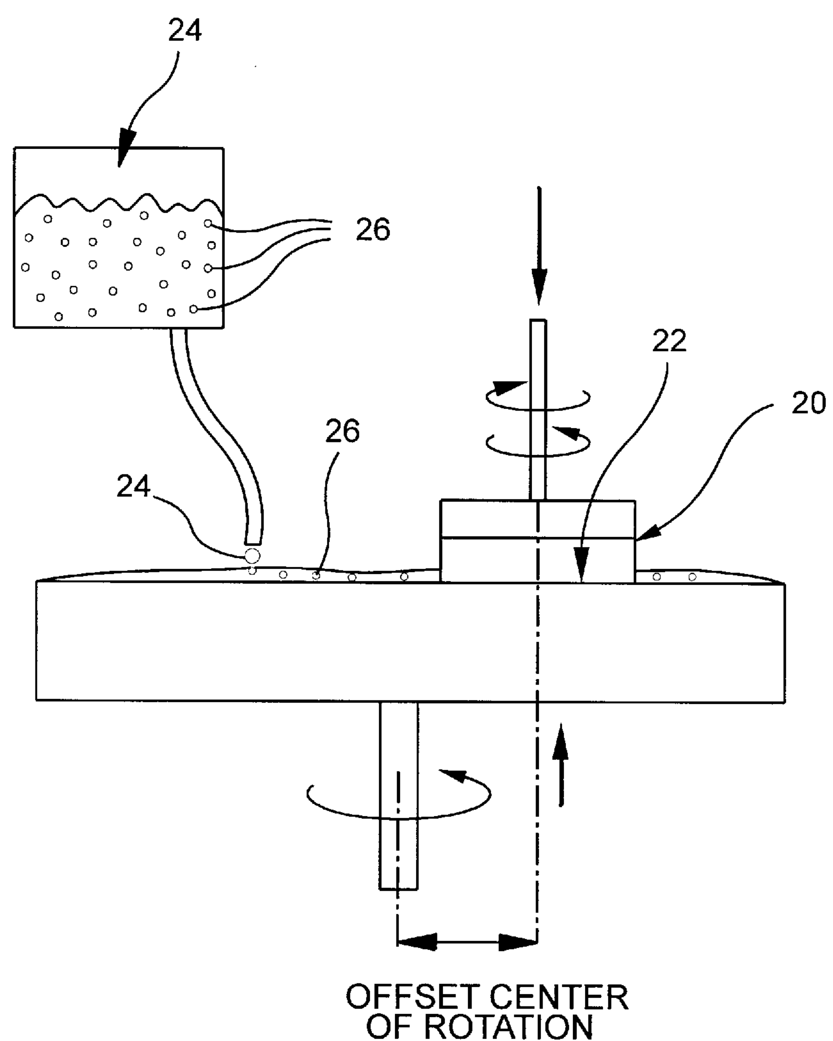
Figure 7:
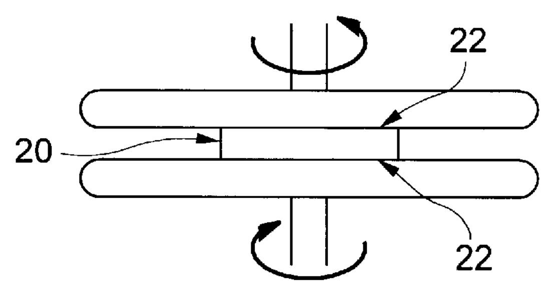
Figure 8:
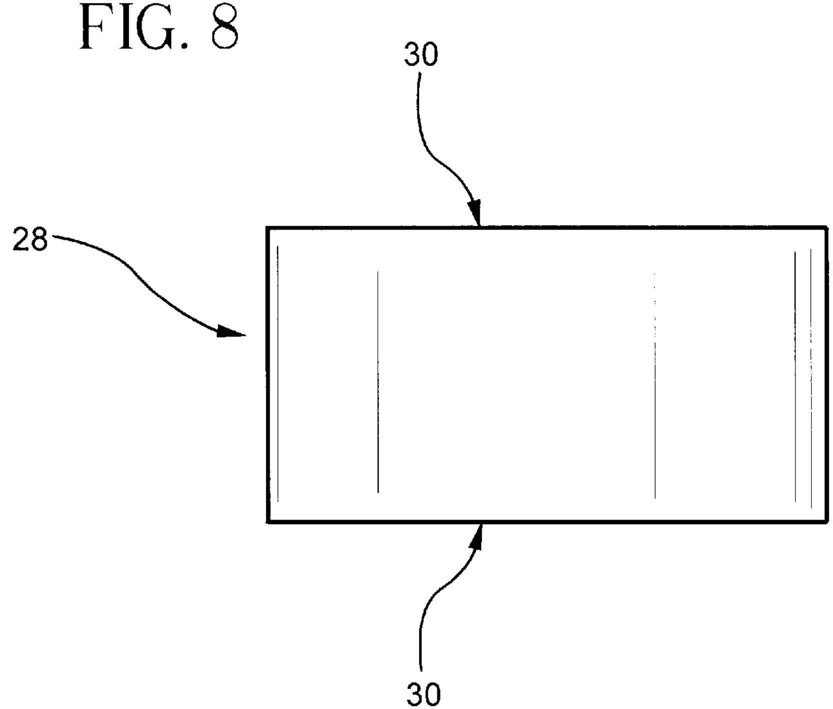
Figure 9:
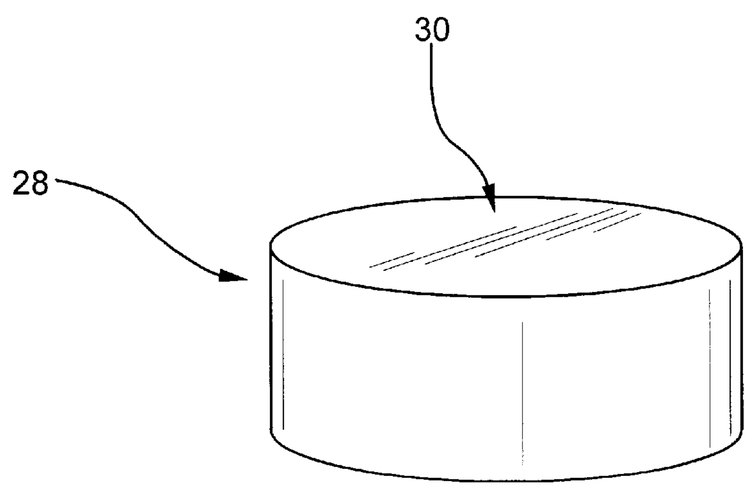
Figure 10:
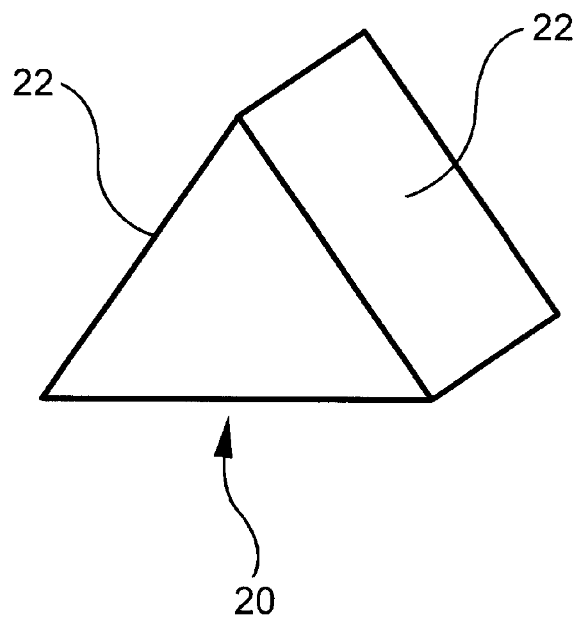
Figure 11:
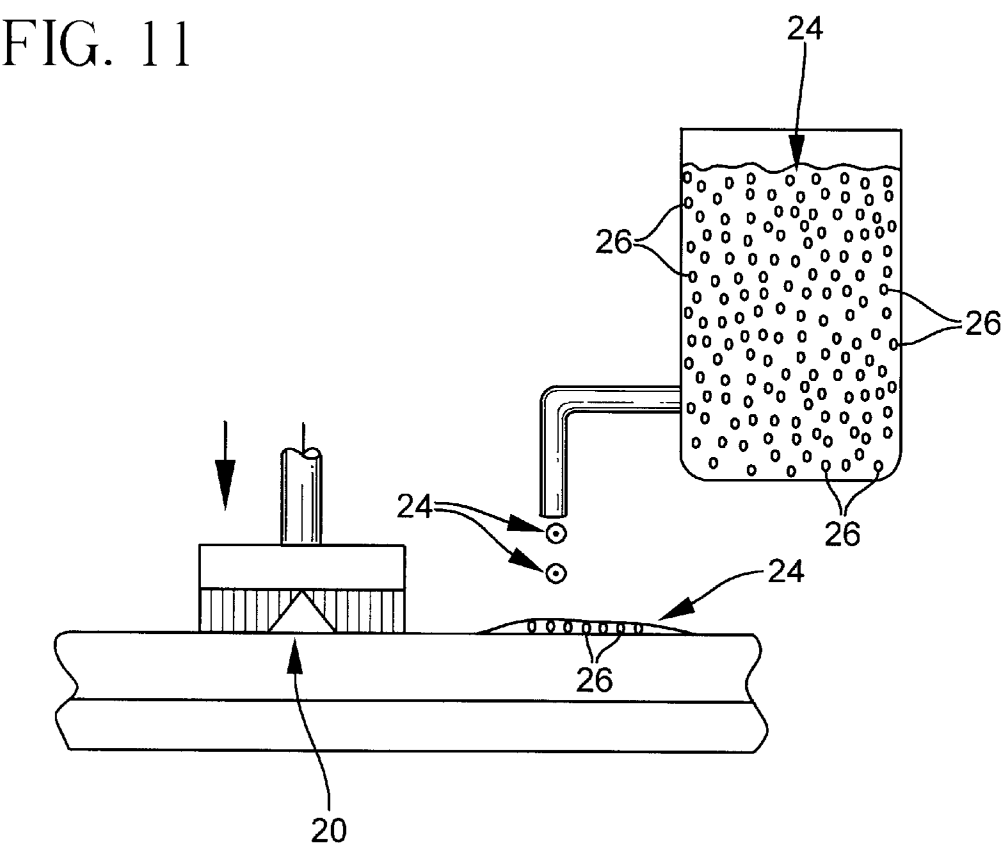
Figure 12:
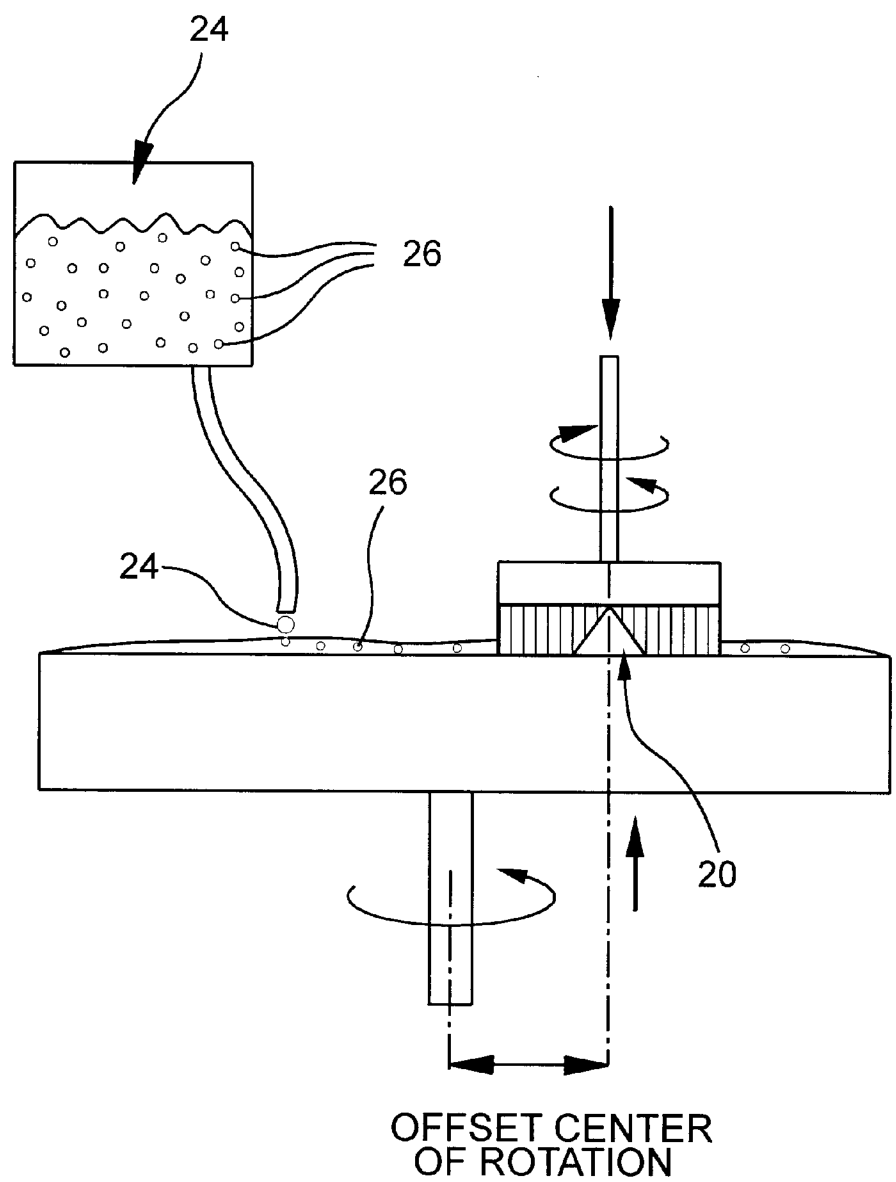
Figure 13:
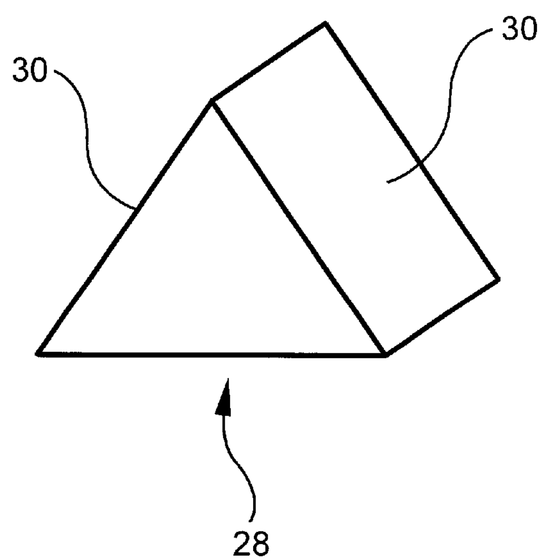
Figure 14:
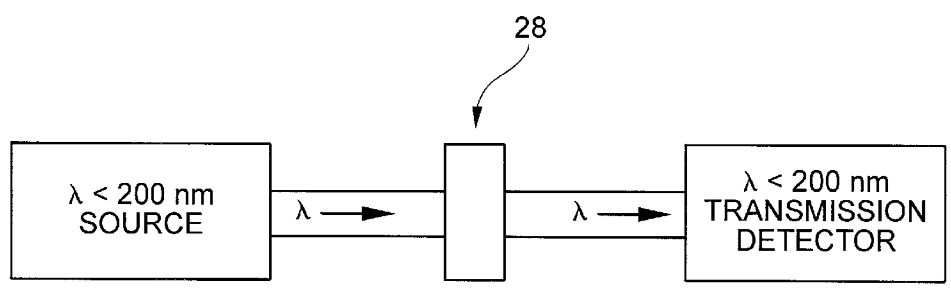

The invention includes a method of making a <200 nm light transmitting optical fluoride crystal preform 20. As shown in FIGS. 3–4, fluoride crystal preform 20 preferably has a first and second initial finished parallel flat optical transmission surfaces 22. Initial finished flat optical transmission surfaces 22 have a ≦50 angstrom RMS surface roughness with an initial finished mid-spatial frequency roughness with 1–1000 μm spatial wavelengths and an initial finished high-spatial frequency roughness with <1 μm spatial wavelengths, with the preform 20 having a low initial finished λ<200 nm transmission LT (%/cm). The method includes providing a final surface processing colloidal non-friable spherical abrasive particle solution 24 having a pH≧9 and a plurality of colloidal non-friable spherical abrasive particles 26 which have a mean particle size in the range from 20 to 300 nm. As shown in FIGS. 5–7, the method includes final polishing initial finished surfaces 22 of preform 20 with final surface processing colloidal particle solution 24. With the final polishing colloidal particle solution 24 the initial finished mid-spatial frequency roughness 1–100 μm spatial wavelengths and the initial finished high-spatial frequency roughness<1 μm spatial wavelengths are removed to provide a final finish polished optical transmission surface. The final polishing with particle solution 24 removes the initial finished wavelengths of preform 20 surfaces 22 to provide a final finished optical fluoride crystal blank 28 having a final finish high optical transmission surface 30 with a final finish λ<200 nm high transmission HT (%/cm) where HT>LT. The final polishing removes the mid-spatial frequency roughness 1–1000 μm spatial wavelengths and the high-spatial frequency roughness<1 μm spatial wavelengths to result in a final finish high optical transmission surface 30 free of the mid-spatial 1–1000 μm spatial wavelengths and the high-spatial<1 μm spatial wavelengths with the final finished crystal 28 having improved transmission of λ<200 nm.

Providing optical fluoride crystal preform 20 preferably includes providing a preform 20 with a low initial finish transmission LT at 193 nm and removing the mid-spatial frequency roughness 1–1000 μm spatial wavelengths and the high spatial frequency roughness<1 μm spatial wavelengths to provide a final finished optical fluoride crystal 28 having a high transmission HT at 193 nm with HT-LT>1 (%/cm at 193 nm). Providing crystal preform 20 preferably includes providing a calcium fluoride crystal preform 20 with a low initial finish transmission LT at 193 nm with LT>90%/cm at 193 nm. In an embodiment, providing optical fluoride crystal preform 20 includes providing a magnesium fluoride crystal preform. In a further embodiment, providing optical fluoride crystal preform 20 includes providing a barium fluoride crystal preform. In another embodiment, providing optical fluoride crystal preform 20 includes providing a lithium fluoride crystal preform. Providing optical fluoride crystal preform 20 includes providing an optical fluoride crystal preform 20 with initial finished surfaces 22 having a ≦20 angstrom RMS surface roughness.

The colloidal spherical abrasive particles 26 of final surface processing particle solution 24 are non-friable in that they have no measurable friability as compared to friable abrasive particles that have a tendency to break apart and form jagged edges which mechanically remove material during polishing by abrasion. Providing final surface processing particle solution 24 preferably includes providing a final surface processing mid-spatial frequency and high-spatial frequency removing silica particle solution with particles 26 comprised of silica. Preferably silica particles 26 are flame-hydrolysis derived silica particles. In a preferred embodiment silica particles 26 of final surface processing solution 24 are flame hydrolysis fused silica soot particles. In a preferred embodiment silica particles 26 are flame hydrolysis fumed silica particles. In an alternative embodiment, silica particles 26 are precipitated silica particles, such as sol-gel derived silica particles. In an embodiment, providing final surface processing solution 24 includes providing a final surface processing mid-spatial frequency and high-spatial frequency removing aluminum oxide particle solution 24 with aluminum oxide particles 26. Providing final surface processing solution 24 includes providing a final surface processing mid-spatial frequency and high-spatial frequency removing particle solution with particles 26 having surface areas in the range of 10 to 200 $m^2$/gram. Preferably particles 26 have surface areas in the range of 20 to 110 $m^2$/gram, and more preferably 20–50 $m^2$/gram. Providing final surface processing solution 24 preferably includes providing a final surface processing mid-spatial frequency and high-spatial frequency removing particle solution having a pH in the range of 9 to 13, and more preferably in the range of 10 to 11. In a preferred embodiment final surface processing solution 24 includes potassium hydroxide. In a further embodiment final surface processing solution 24 includes ammonium hydroxide. In another embodiment final surface processing solution 24 includes sodium hydroxide.

In a preferred embodiment the method includes qualifying final finished optical fluoride crystal 28 for use as a λ<200 nm optical element crystal, which preferably includes measuring the 193 nm transmission of crystal 28, and more preferably includes measuring the 157 nm transmission of crystal 28. In an embodiment the method includes forming final finished optical fluoride crystal 28 into a <200 nm laser component optical element in a <200 nm laser, preferably at a fluence<20 J/$cm^2$, more preferred at a fluence<10 J/$cm^2$, and further at a fluence 1<J/$cm^2$. Preferably the crystal 28 is formed into a 157 nm laser component such as a window, a prism, or lens. In an embodiment the method includes forming final finished optical fluoride crystal 28 into a <200 nm optical lithography element, preferably with the optical lithography element utilized at a fluence<20 J/$cm^2$, more preferred <10 J/$cm^2$, and further at a fluence 1<J/$cm^2$. Preferably the optical fluoride crystal optical element is utilized in the transmission of 157 nm light.

As shown in FIGS. 3–14 the invention includes a method of making an ultraviolet λ<200 nm qualified optical fluoride crystal that is qualified for use at a wavelength λ<200 nm and a fluence<20 J/$cm^2$. The method includes providing optical fluoride crystal preform 20 having a first initial finished flat optical transmission surface 22 which has a ≦50 angstrom RMS surface roughness with initial finished mid-spatial frequency roughness 1–1000 μm spatial wavelengths and initial finished high-spatial frequency roughness<1 μm spatial wavelengths, and with preform 20 having a low initial finish λ<200 nm transmission LT (%/cm). The method includes providing final polishing mid-spatial frequency and high-spatial frequency removing colloidal abrasive particle solution 24, preferably with colloidal $SiO_2$ particles 26. Provided colloidal particle solution 24 preferably has a pH≧9 and a plurality of colloidal $SiO_2$ particles 26. Colloidal particles 26 preferably have a mean particle size in the range from 20 to 300 nm. The method includes final polishing initial finished surface 22 with provided spatial frequency wavelength removing final polishing particle solution 24 to remove the initial finished mid-spatial frequency roughness 1–1000 μm spatial wavelengths and the high-spatial frequency<1 μm spatial wavelengths to provide final finished optical fluoride crystal 28 having final finish high optical transmission surface 30 and with final finish fluoride crystal 28 having a final finish λ<200 nm high transmission HT (%/cm) with HT>LT. The method includes transmitting a final use wavelength λ<200 nm light beam with a fluence<20 J/$cm^2$ through final finish high optical transmission surface 30 to provide a qualifying optical transmission measurement for the wavelength λ<200 nm, preferably with a fluence<10 J/$cm^2$, and more preferably with a fluence<1 J/$cm^2$.

Providing preform 20 preferably includes providing a preform 20 with a low initial finish transmission LT at 193 nm and removing the mid-spatial frequency 1–1000 μm spatial wavelengths and the high-spatial frequency<1 μm spatial wavelengths to provide a final finished optical fluoride crystal 28 having a high transmission HT at 193 nm with HT-LT>(%/cm at 193 nm), preferably with LT>90%/cm at 193 nm. In the practice of the invention a preform 20 with a LT=90.3% at 193 was improved by removal of the 1–1000 μm spatial wavelengths and the <1 μm spatial wavelengths to result in a final finish crystal 28 with HT=91.98%. In an embodiment provided preform 20 is a calcium fluoride crystal preform with a low initial finish transmission LT at 193 nm that is greater than 90%/cm. In an embodiment provided preform 20 is a magnesium fluoride crystal preform. In another embodiment provided preform 20 is a barium fluoride crystal preform. In a further embodiment provided preform 20 is a lithium fluoride crystal preform. Provided preform 20 preferably has a ≦20 angstrom RMS surface roughness.

Providing spatial wavelength removing final polishing colloidal spherical abrasive particle solution 24 preferably includes providing colloidal spherical abrasive $SiO_2$ particles 26. In an embodiment $SiO_2$ particles 26 are flame-hydrolysis derived fused silica soot particles. In an embodiment $SiO_2$ particles 26 are flame-hydrolysis derived fumed silica soot particles. In an embodiment $SiO_2$ particles 26 are precipitated silica particles, such as sol-gel derived particles. Preferably the $SiO_2$ particles 26 have a surface area in the range of 10 to 200 $m^2$/gram, more preferred 20 to 110 $m^2$/gram, and most preferred 20 to 50 $m^2$/gram. Provided particle solution 24 preferably has a pH in the range of 9 to 13, and more preferred in the range of 10 to 11. In an embodiment particle solution 24 contains potassium hydroxide. In an embodiment particle solution 24 includes ammonium hydroxide. In an embodiment particle solution 24 contains sodium hydroxide.

In an embodiment, the method further includes forming the final finished optical fluoride crystal into a <200 nm laser component optical element such as a laser window, a laser prism, or laser lens, preferably with the laser component used to transmit 157 nm light, and most preferably 157 nm light at a fluence<10 J/$cm^2$, and further preferred a fluence<1 J/$cm^2$.

In an embodiment, the method further includes final finished optical fluoride crystal into a <200 m optical lithography element such as a lens or beam splitter, preferably with the optical element used to transmit 157 nm light, and most preferably 157 nm light at a fluence<10 J/$cm^2$, and more preferred <1 J/$cm^2$.

The invention includes making a wavelength λ<200 nm optical calcium fluoride crystal, preferably for use at a <20 J/$cm^2$ fluence. The method includes providing a calcium fluoride crystal preform 20 having initial finished flat optical transmission surfaces 22 having a ≦50 angstrom RMS surface roughness with initial finished mid-spatial frequency roughness 1–1000 μm spatial wavelengths and high-spatial frequency roughness<1 μm spatial wavelengths. Provided calcium fluoride crystal preform 20 has a low initial finish λ<200 nm transmission LT (%/cm). The method includes providing final polishing mid-spatial and high-spatial frequency spatial wavelength removing colloidal $SiO_2$ particle solution 24 having a pH≧9 and colloidal $SiO_2$ particles having a mean particle size in the range from 20 to 30 nm. The method includes final polishing surfaces 22 of preform 20 with the particle solution 24 to remove the initial finished spatial frequency spatial wavelengths to provide a final finished optical calcium fluoride crystal 28 having final finish high optical transmission surfaces 30 with crystal 28 having a λ<200 nm high transmission HT (%/cm) with HT>LT. The method includes transmitting a final use wavelength λ<200 nm, light beam through the final finish high optical transmission surfaces to provide a qualifying optical transmission measurement for the wavelength λ<200 nm and a qualified crystal 28. Preferably the method includes qualifying the crystal 28 for use at a fluence<20 J/$cm^2$, more preferred <10 J/$cm^2$, and most preferred <1 J/$cm^2$. Providing preform 20 preferably includes providing a calcium fluoride crystal preform 20 with a low initial finish transmission LT at 193 nm and removing the mid-spatial frequency roughness 1–1000 μm spatial wavelengths and the high-spatial frequency roughness<1 μm spatial wavelengths to provide a final finished optical calcium fluoride crystal having a high transmission HT at 193 nm with HT-LT>1 (%/cm at 193 nm), preferably with LT>90%/cm at 193 nm. In a preferred embodiment provided calcium fluoride crystal preform 20 has initial finished surfaces 22 with a ≦20 angstrom RMS surface roughness.

In an embodiment, provided particle solution 24 is comprised of fused silica soot particles. In an embodiment, provided particle solution 24 is comprised of fumed silica particles. In an embodiment, provided particle solution 24 is comprised of precipitated silica particles. Preferably $SiO_2$ particles 26 have surface areas in the range of 10 to 200 $m^2$/gram, more preferred 20 to 110 $m^2$/gram. Preferably particle solution 24 has a pH in the range of 9 to 13, more preferred in the range of 10 to 11. In an embodiment particle solution 24 contains potassium hydroxide. In an embodiment particle solution 24 contains ammonium hydroxide. In an embodiment particle solution 24 contains sodium hydroxide.

The initial finished optical transmission surfaces are preferably provided by making a single crystal optical fluoride crystal boule such as produced by the Stockbarger method, with low impurity levels and high transmission. The single crystal boule is machined preferably to flat surfaces, most preferably two opposing surfaces that are flat and parallel to each other. Machining damage is then removed using either fixed or loose abrasive grinding (such lapping), preferably using abrasives of ≧6 μm in size, preferably ≧7 μm. The initial finished optical transmission surfaces are then provided by a multi-step polishing that improves the surface and maintains flatness. Preferably the multi-step polishing is with mechanical abrasives of gradually reduced particle sizes in neutral pH solution (pH 6–8) with the particle sizes in the range of about 3 to 0.1 μm, with examples of mechanical abrasives including $Al_2O_3$, diamond, SiC and $ZrO_2$.

The inventive removal of surface roughness mid-spatial frequency roughness 1–1000 μm spatial wavelengths and high-spatial frequency roughness<1 μm spatial wavelengths and subsurface damage provides advantageous metrology measurements of the crystal particularly transmission measurements. The invention provides for qualification of optical transmission without the need to perform multi-pathlength sample measurements which are normally used to estimate transmittance loss from surface defects. The invention eliminates the need to make multi-path length samples. The invention provides faster and lower qualification costs and improved costs in terms of making optical elements by certifying and qualifying the crystals transmission prior to formation into the optical element.

In a preferred embodiment, provided optical fluoride crystal preform 20, is a <111> oriented $CaF_2$ crystal with the initial finished surface 22 being the [111] crystal plane. In a preferred alternative the provided crystal preform 20 is a <100> oriented $CaF_2$ crystal with initial finished surface 22 being the [100] crystal plane. In accordance with the invention, the surface quality in terms of mid and high-spatial frequency roughness and subsurface damage strongly affect transmittance, with greater increases in transmittance with improved surface quality at lower wavelengths. Specifically for 193 nm, transmittance increased from 90.30% for a 1.4 nm RMS surface to 91.98% for an 0.8 nm RMS surface ($\Delta$=1.68%). The invention provides improved transmission by removal and elimination of mid-spatial frequency roughness 1–1000 $\mu$m spatial wavelengths and high-spatial frequency roughness<1 $\mu$m spatial wavelengths.

The invention provides improved $CaF_2$ surfaces for internal transmittance measurement using a final step polish that removes surface and subsurface damage remnant from previous, mechanical polishing. This final step polish is performed using a spherical, non-friable abrasive dispersed in an alkali environment (pH of 9–12). The abrasive particles can include but are not limited to such materials as flame hydrolysis $SiO_2$ (fumed or fused), precipitated $SiO_2$, and precipitated $Al_2O_3$. The final polishing step using the spherical, non-friable particles in high pH solutions is a chemical-mechanical process. The example application utilizes filmed $SiO_2$. This process is preferably implemented for metrology in terms of transmission & laser damage (TLD) samples and for manufacturing of excimer laser components and lithographic products.

The invention includes characterizing surface quality in order to qualifying what aspects of a surface need to be improved in order to enhance optical performance. In the following example of the invention transmission performance was tested for calcium fluoride single crystals as a function of two different surface qualities. Characterization of the processed surfaces was performed using optical interferometry and atomic force microscopy to determine what types of surface defects were prevalent for the $CaF_2$ and to what extent such defects affect transmission performance. Surface quality is discussed in terms of mid and high-spatial frequency roughness (1–1000 $\mu$m and <1 $\mu$m spatial wavelength ranges respectively).

A single-crystal calcium fluoride boule was produced using the Stockbarger method with a bulk CTE of $18.85\times10^{-6}/°$ C. (see Table 1). The crystal was cut into single pathlength samples with the (111) plane as the parallel, exposed surface. The samples were double-side ground and lapped, then multi-step polished using purely mechanical abrasives with gradually reduced particle sizes (referred to as finishing protocol A) to provide initial finished optical fluoride crystal preforms. Knoop hardness for the exposed and polished surfaces was determined to range between 152–159 kg/mm$^2$, depending on orientation between the long axis of the indenter and crystallographic direction (i.e., azimuthal angle). Sample surfaces were plasma cleaned and characterized using scanning white light optical interferometry at magnifications of 5× and 40× (scan areas of 1.48 and 0.023 mm$^2$ respectively), analyzing for mid-spatial frequency defects and macroscopic surface roughness. Atomic force microscopy (AFM) was further used to characterize for high-spatial frequency scratches and microscopic surface roughness. Samples were then tested for transmittance using a tungsten/deuterium dual beam UV/VIS spectrophotometer with nitrogen purge and beam size of 27 mm$^2$. Spectral scans were performed from 185–400 nm with a 30 nm/min scan speed, and single wavelength tests were performed at 185, 193, 205, 248, and 400 nm with a 60 second dwell time at each wavelength. The system had a wavelength accuracy of ±0.2 nm and transmittance accuracy of ±0.03%/cm. Upon completion, each surface was further polished using a spherical, non-friable abrasive (fumed $SiO_2$) in a chemically adjusted environment (ammonium hydroxide solution with pH of 10–10.5) that promoted the formation of scratch and subsurface damage free surfaces (referred to as finishing protocol B) in accordance with the invention. Cleaning, surface characterization, and transmittance testing were repeated on the re-processed samples. Change in pathlength for re-processed samples was less than 0.5%.

Figure 15A:
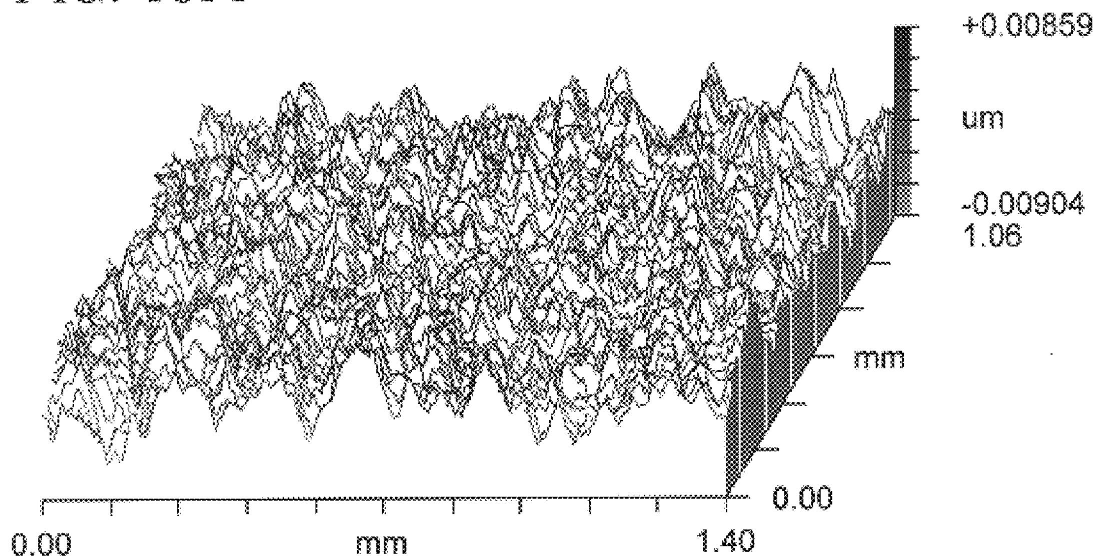
FIG. 15 are optical interferometry images of $CaF_2$ surfaces prepared with finishing protocols A (FIG. 15*a*—initial finished optical transmission surface) and B in accordance with the invention (FIG. 15*b*—final finish polished optical transmission surface).
Figure 15B:
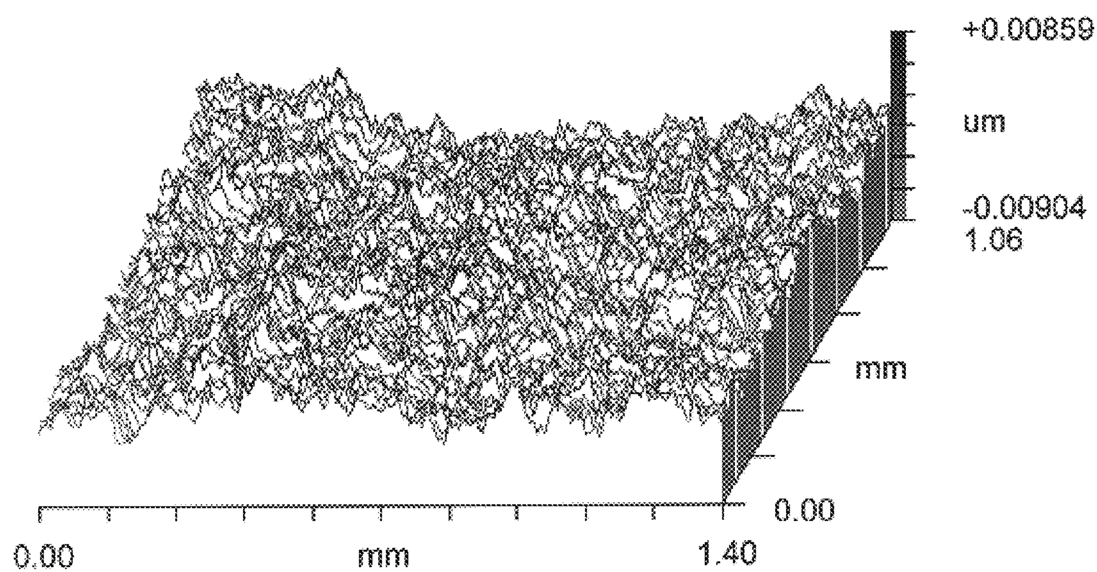
Figure 16A:
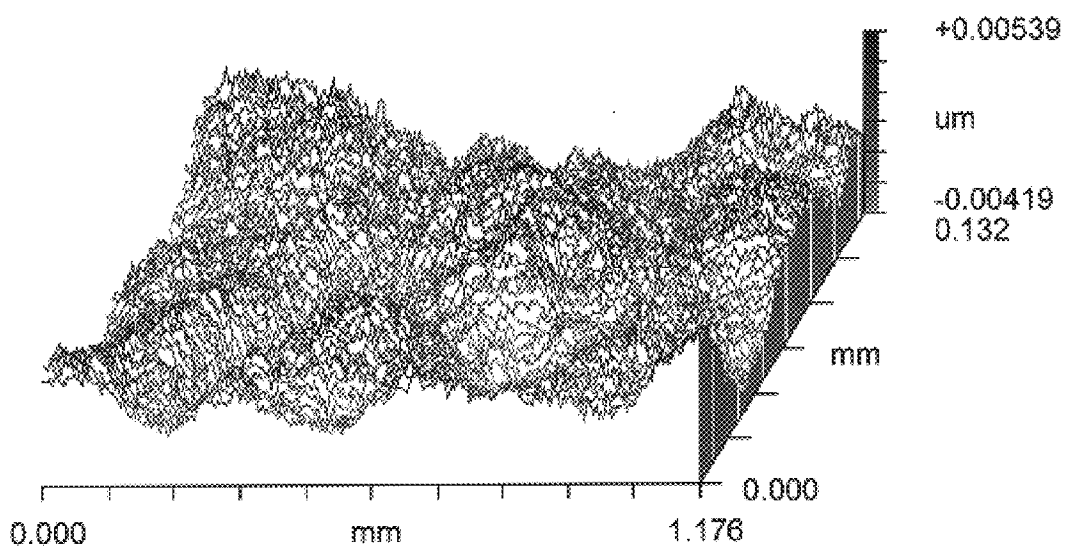
FIG. 16 are optical interferometry images of $CaF_2$ surfaces prepared with finishing protocols A (FIG. 16*a*—initial finished optical transmission surface) and B (FIG. 16*b*—final finish polished optical transmission surface) in accordance with the invention.
Figure 16B:
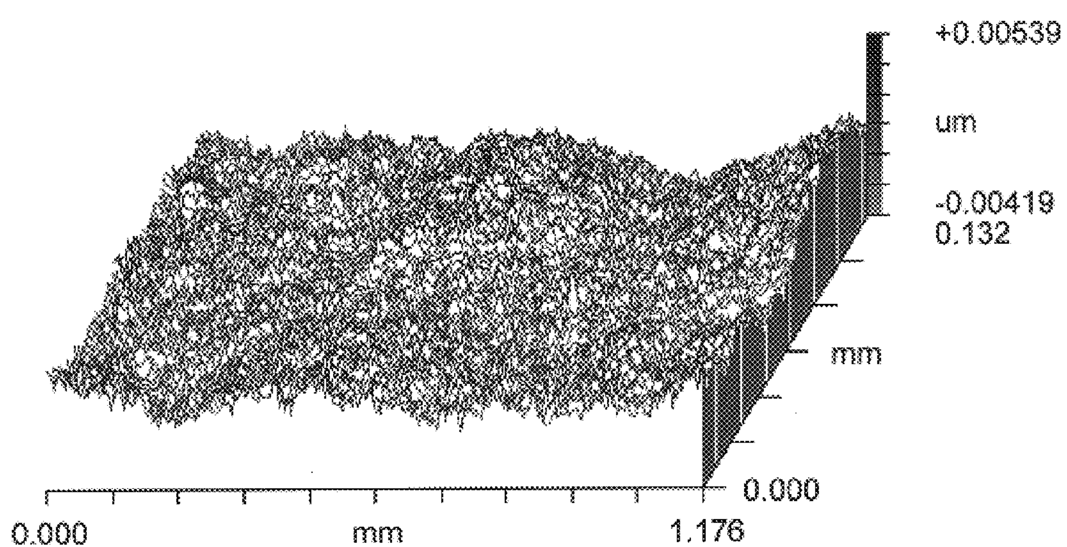
Figure 17A:
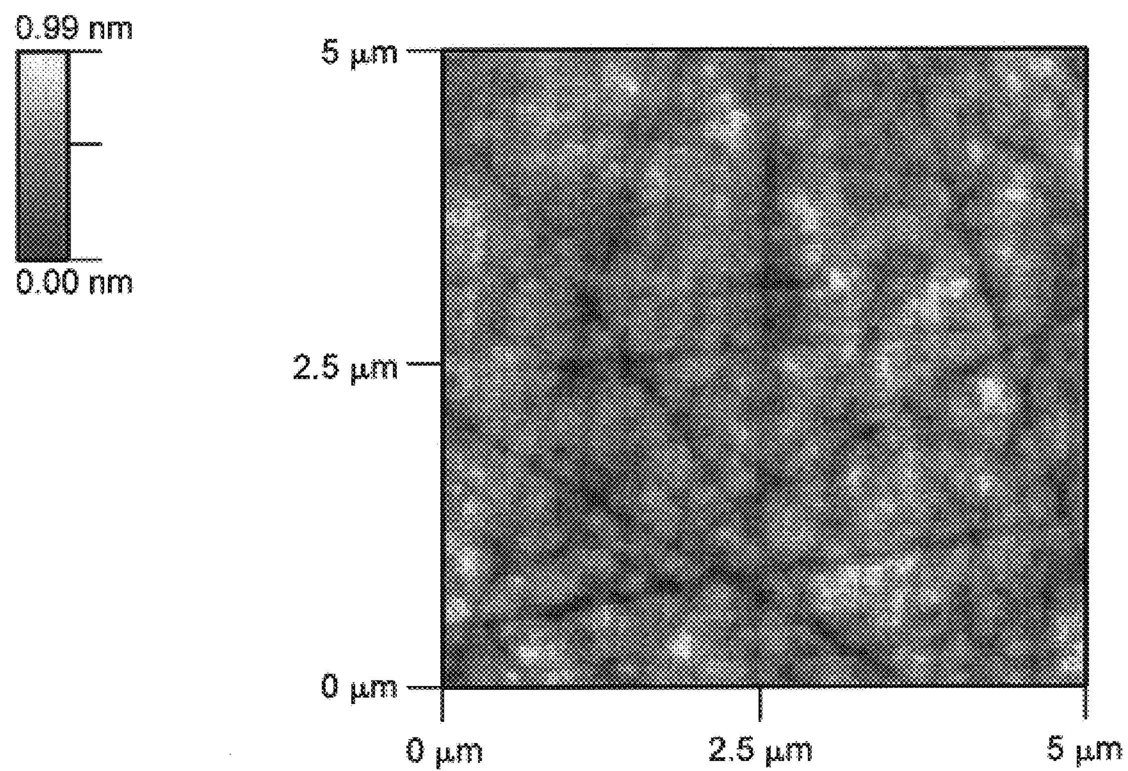
FIG. 17 are Atomic Force Micrographs of $CaF_2$ surfaces prepared with finishing protocols A (FIG. 17*a*—initial finished optical transmission surface) and B (FIG. 17*b*—final finish polished optical transmission surface) in accordance with the invention. Atomic force micrograph FIG. 17(*a*) shows a surface quality of Ra=0.15 nm, RMS=0.20 nm, and Rt=1.75 nm, and Atomic force micrograph FIG. 17(*b*) shows a surface quality of Ra=0.13 nm, RMS-0.17 nm, and Rt=1.35 nm.
Figure 17B:
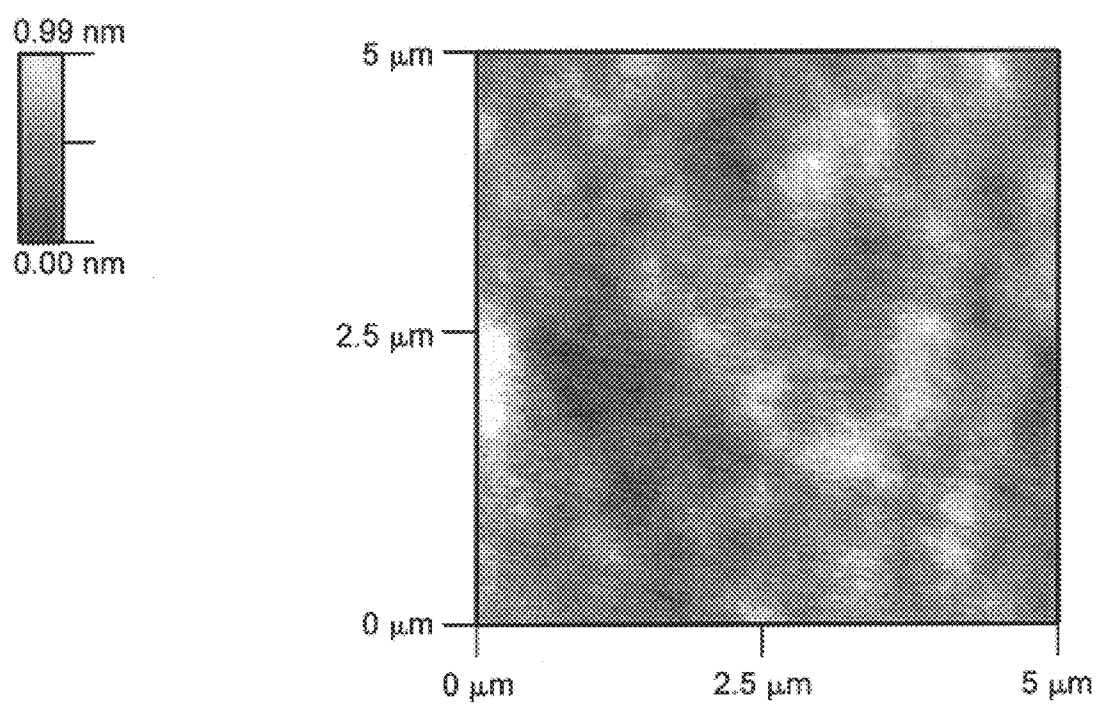

Results for surface analysis of the $CaF_2$ are shown in Table 2. The purely mechanical polishing process (finishing protocol A) resulted in macroscopic surface roughness values of 2.0 and 1.4 nm RMS for 1.48 and 0.023 mm$^2$ scan areas respectively as determined using optical interferometry (magnifications of 5× and 40×). Scans at 5× magnification indicate no scratching or frequency-dependent defects (FIG. 15(*a*)). However, analysis at 40× magnification (FIG. 16(*a*)) indicates the presence of mid-spatial frequency roughness represented by differences in locally, semi-planar regions on the surface (i.e., high and low spots repeated laterally every 25–50 $\mu$m with step-heights of approximately 10 nm as determined by peak-to-valley data). Additional analysis using AFM to produce 25 $\mu$m scans (FIG. 17(*a*)) shows the presence of high-spatial frequency scratches, with a microscopic surface roughness of 0.2 nm RMS.

Application of the chemical-mechanical final polishing step (finishing protocol B) in accordance with the invention further improved the surface finish to 1.5 and 0.8 nm RMS for the 1.48 and 0.023 mm scan areas respectively. Furthermore, the additional final processing step removed the presence of mid-spatial frequency roughness as previously observed when testing at 40× magnification (FIG. 16(*b*)). Supporting these visual observations are improved peak-to-valley values, indicating the removal of local, semi-planar regions (see Table 2). AFM analysis (FIG. 17(*b*)) indicates the removal of the high-spatial frequency scratches with a similar microscopic surface finish of approximately 0.2 nm RMS.

Figure 18:
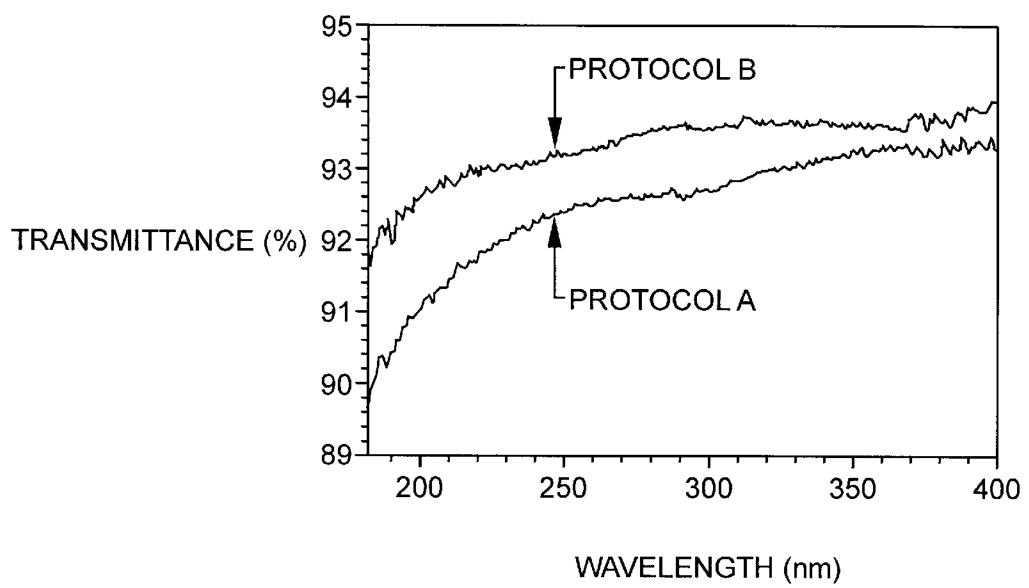
FIG. 18 illustrates a plot of transmittance from 185 to 400 nm demonstrating the performance improvement for a (111) $CaF_2$ sample prepared first to a surface quality of 1.4 nm RMS (Protocol A—initial finished optical transmission surface) and then to a surface quality of 0.8 nm RMS (Protocol B—final finish polished optical transmission surface) free of mid-spatial frequency roughness 1–1000 μm spatial wavelengths and high-spatial frequency roughness<1 μm spatial wavelengths in accordance with the invention, as determined using optical interferometry. Change in pathlength with the additional final polishing processing was less than 0.5%.

UV/VIS spectrophotometry scans performed on a representative (111) $CaF_2$ sample prepared first using initial finishing protocol A and then using the additional final polishing processing step previously defined for finishing protocol B are shown in FIG. 18. As wavelength decreases, the extent in which surface quality affects transmittance increases. However, the significance of the improved transmittance results are more accurately quantified using single wavelength transmission test results as shown in Table 3, where test accuracy is greater due to a 60 second dwell time. For each wavelength there is a measurable improvement in transmittance performance with improved surface quality. Specifically for 193 nm, the difference between the two finishing protocols accounts for difference in transmittance performance of 1.68%. These results represent the combined effect of mid-spatial and high-spatial frequency roughness on transmittance for $CaF_2$, and demonstrate the sensitivity of deep UV wavelengths to surface quality and particularly to mid-spatial frequency roughness 1–1000 $\mu$m spatial wavelengths and high-spatial frequency roughness <1 $\mu$m spatial wavelengths.

Although transmittance testing indicates significant improvements in the optical performance of (111) $CaF_2$ with the additional use of a chemical-mechanical polishing step, results cannot be attributed to improvement in surface roughness alone. AFM analysis (FIG. 17(*a*)) shows the presence of high-spatial frequency scratches for surfaces processed using the purely mechanical process (i.e., initial finishing protocol A). The formation of these scratches is believed to be accompanied by a certain degree of subsurface damage in the form of shallow cracks that propagated into the surface during mechanical polishing. Such damage is believed to decrease transmittance by scattering light. Use of the chemical-mechanical polishing step (i.e., finishing protocol B) is shown to remove the high-spatial frequency scratches (FIG. 17(*b*)) and is further believed to have removed associated subsurface damage. The improved transmittance is believed to be partially dependent on the removal of subsurface damage.

Optical testing of differentially prepared $CaF_2$ samples has shown a significant effect of surface quality on transmittance. Specifically at 193 nm, transmittance was found to increase from 90.30% for a 1.4 nm RMS surface prepared by a multi-step polishing protocol using purely mechanical abrasives to 91.98% for the same surface further processed to 0.8 nm RMS using a chemical-mechanical final polishing step with spherical, non-friable abrasive particles in alkali solution. The differences in surface qualities were in the elimination of mid and high-spatial frequency roughness as determined by analysis with optical interferometry and atomic force microscopy. Also evident was the elimination of subsurface damage that accompanies purely mechanical polishing.

TABLE 1

Physical properties of $CaF_2$. Hardness and thermal expansion values are specific to the (111) orientation, with the range of values for Knoop hardness representing differences in the azimuthal angle.

| Property | $CaF_2$ |
|---|---|
| Structure | Cubic |
| Density (g/cc) | 3.18 |
| Elastic Modulus (GPa) | 75.8 |
| Knoops Hardness ($HK_{300}$) kg/mm$^2$) | 152–159 |
| Thermal Expansion, 0–300° C. (×$10^{-6}$/° C.) | 18.85 |

TABLE 2

Surface roughness for a (111) $CaF_2$ sample prepared by purely mechanical polishing (Finishing Protocol A) and with the added used of a chemical-mechanical final polishing step (Finishing Protocol B) in accordance with the invention, reported in terms of average roughness (Ra), root-mean-square roughness (RMS) and peak-to-valley (Rt).

| Instrument & | Finishing Protocol A | | | Finishing Protocol B | | |
|---|---|---|---|---|---|---|
| Scan Size | Ra (nm) | RMS (nm) | Rt (nm) | Ra (nm) | RMS (nm) | Rt (nm) |
| Optical Interferometry | | | | | | |
| 1.48 mm$^2$ | 1.63 ± 0.06 | 2.03 ± 0.07 | 17.45 ± 3.15 | 1.20 ± 0.12 | 1.50 ± 0.14 | 12.82 ± 1.57 |
| 0.023 mm$^2$ | 1.13 ± 0.28 | 1.39 ± 0.32 | 11.48 ± 5.03 | 0.64 ± 0.07 | 0.80 ± 0.08 | 6.97 ± 0.86 |
| Atomic Force Microscopy | | | | | | |
| 25 $\mu$m$^2$ | 0.16 ± 0.01 | 0.20 ± 0.01 | 1.66 ± 0.12 | 0.15 ± 0.03 | 0.19 ± 0.03 | 1.51 ± 0.23 |

TABLE 3

Transmittance (low initial finish transmission LT) (final finish high transmission HT) values for 1 cm thick $CaF_2$ sample prepared to the two different surface qualities (see Table 2) at wavelengths of 185, 193, 205, 248, and 400 nm, including differences in transmittance (Δ) between the two finishing protocols.

| Wavelength (nm) | LT Protocol A | HT Protocol B | HT-LT |
|---|---|---|---|
| 400 | 93.28% | 93.51% | 0.23% |
| 248 | 92.20% | 93.00% | 0.80% |
| 205 | 90.94% | 92.41% | 1.47% |
| 193 | 90.30% | 91.98% | 1.68% |
| 185 | 89.68% | 91.59% | 1.91% |

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. A method of making a <200 nm light transmitting optical fluoride crystal for transmitting less than 200 nm light, said method comprising:

providing an optical fluoride crystal preform, said preform having a first and second initial finished parallel flat optical transmission surfaces, said initial finished surfaces having a ≦50 angstrom RMS surface roughness with an initial finished mid-spatial frequency roughness with 1–1000 $\mu$m spatial wavelengths and an initial finished high-spatial frequency roughness with <1 $\mu$m spatial wavelengths, said initial finished preform having a low initial finish $\lambda$<200 nm transmission LT (%/cm);

providing a final surface processing colloidal nonfriable spherical abrasive particle solution, said final surface processing solution having a pH≧9 and a plurality of colloidal nonfriable spherical abrasive particles, said particles having a mean particle size in the range from 20 to 300 nm, final polishing said initial finished surfaces with said final surface processing colloidal particle solution into a final polished optical transmissions surface with said final polishing final surface processing colloidal particle solution removing said initial finished mid-spatial frequency roughness 1–1000 $\mu$m spatial wavelengths and said initial finished high-spatial frequency roughness<1 $\mu$m spatial wavelengths to provide a final finished optical fluoride crystal having a final finish polished high optical transmission surface with a final finish $\lambda$<200 nm high transmission HT (%/cm), with HT>LT.

2. A method as claimed in claim 1, wherein providing an optical fluoride crystal preform includes providing a preform with a low initial finish transmission LT at 193 nm and removing said mid-spatial frequency roughness 1–1000 $\mu$m spatial wavelengths and said high-spatial frequency roughness<1 $\mu$m spatial wavelengths to provide a final finished optical fluoride crystal having a high transmission HT at 193 nm with HT-LT>1 (%/cm @ 193 nm).

3. A method as claimed in claim 1, wherein providing an optical fluoride crystal preform includes providing a calcium fluoride crystal preform with a low initial finish transmission LT at 193 nm with LT>90%/cm @ 193 nm.

4. A method as claimed in claim 1, wherein providing an optical fluoride crystal preform includes providing a magnesium fluoride crystal preform.

5. A method as claimed in claim 1, wherein providing an optical fluoride crystal preform includes providing a barium fluoride crystal preform.

6. A method as claimed in claim 1, wherein providing an optical fluoride crystal preform includes providing a lithium fluoride crystal preform.

7. A method as claimed in claim 1, wherein providing an optical fluoride crystal preform includes providing an optical fluoride crystal preform with said initial finished surfaces having a ≦20 angstrom RMS surface roughness.

8. A method as claimed in claim 1, wherein providing a final surface processing colloidal non-friable spherical abrasive particle solution includes providing a final surface processing mid-spatial frequency and high-spatial frequency removing silica particle solution.

9. A method as claimed in claim 8, wherein said mid-spatial frequency and high-spatial frequency removing $SiO_2$ particle solution is comprised of a plurality of fused silica soot particles.

10. A method as claimed in claim 8, wherein said mid-spatial frequency and high-spatial frequency removing $SiO_2$ particle solution is comprised of a plurality of fumed silica particles.

11. A method as claimed in claim 8, wherein said mid-spatial frequency and high-spatial frequency removing $SiO_2$ particle solution is comprised of a plurality of precipitated silica particles.

12. A method as claimed in claim 1, wherein providing a final surface processing solution includes providing a final surface process mid-spatial frequency and high-spatial frequency removing aluminum oxide particle solution.

13. A method as claimed in claim 1, wherein providing a final surface processing solution includes providing a final surface processing mid-spatial frequency and high-spatial frequency removing particle solution with a plurality of particles with surface area in the range of 10 $m^2$/gram to 200 $m^2$/gram.

14. A method as claimed in claim 13, wherein said particles have a surface area in the range of 20 to 110 $m^2$/gram.

15. A method as claimed in claim 1, wherein providing a final surface processing solution includes providing a final surface processing mid-spatial frequency and high-spatial frequency removing particle solution having a pH in the range of 9 to 13.

16. A method as claimed in claim 15, wherein said solution has a pH in the range of 10 to 11.

17. A method as claimed in claim 15, wherein said solution includes potassium hydroxide.

18. A method as claimed in claim 15, wherein said solution includes ammonium hydroxide.

19. A method as claimed in claim 15, wherein said solution includes sodium hydroxide.

20. A method as claimed in claim 1, said method further comprising forming said final finished optical fluoride crystal into a <200 nm laser component.

21. A method as claimed in claim 1, said method further comprising forming said final finished optical fluoride crystal into a <200 nm optical lithography element.

22. A method as claimed in claim 1, said method further comprising qualifying said final finished optical fluoride crystal for use as a λ<200 nm optical element crystal.

23. A method of making an ultraviolet optical fluoride crystal qualified for use at a wavelength λ<200 nm, said method comprising:

providing an optical fluoride crystal preform, said preform having a first initial finished flat optical transmission surface, said initial finished surface having a ≦50 angstrom RMS surface roughness with an initial finished mid-spatial frequency roughness 1–1000 μm spatial wavelengths and an initial finished high-spatial frequency roughness<1 μm spatial wavelengths, said initial finished preform having a low initial finish λ<200 nm transmission LT (%/cm);

providing a final polishing mid-spatial frequency and high-spatial frequency removing colloidal spherical abrasive $SiO_2$ particle solution, said mid-spatial frequency and high-spatial frequency removing solution having a pH≧9 and a plurality of colloidal $SiO_2$ particles, said particles having a mean particle size in the range from 20 to 300 nm, final polishing said initial finished surface with said mid-spatial frequency and high-spatial frequency removing solution into a final polished optical transmission surface with said mid-spatial frequency and high-spatial frequency removing solution and removing said initial finished mid-spatial frequency roughness 1–1000 μm spatial wavelengths and said initial finished high-spatial frequency<1 μm spatial wavelengths to provide a final finished optical fluoride crystal having a final finish high optical transmission surface with a final finish λ<200 nm high transmission HT (%/cm), with HT>LT, transmitting a final use wavelength λ<200 nm light beam with a fluence<20 J/$cm^2$ through said final finish high optical transmission surface to provide a qualifying optical transmission measurement for said wavelength λ<200 nm.

24. A method as claimed in claim 23, wherein providing an optical fluoride crystal preform includes providing a preform with a low initial finish transmission LT at 193 nm and removing said mid-spatial frequency roughness 1–1000 μm spatial wavelengths and said high-spatial frequency roughness<1 μm spatial wavelengths to provide a final finished optical fluoride crystal having a high transmission HT at 193 nm with HT-LT>1 (%/cm @ 193 nm).

25. A method as claimed in claim 23, wherein providing an optical fluoride crystal preform includes providing a calcium fluoride crystal preform with a low initial finish transmission LT at 193 nm with LT>90%/cm @ 193 nm.

26. A method as claimed in claim 23, wherein providing an optical fluoride crystal preform includes providing a magnesium fluoride crystal preform.

27. A method as claimed in claim 23, wherein providing an optical fluoride crystal preform includes providing a barium fluoride crystal preform.

28. A method as claimed in claim 23, wherein providing an optical fluoride crystal preform includes providing a lithium fluoride crystal preform.

29. A method as claimed in claim 23, wherein providing an optical fluoride crystal preform includes providing an optical fluoride crystal preform with said initial finished surfaces having a ≦20 angstrom RMS surface roughness.

30. A method as claimed in claim 23, wherein said mid-spatial frequency and high-spatial frequency removing $SiO_2$ particle solution is comprised of a plurality of fused silica soot particles.

31. A method as claimed in claim 23, wherein said mid-spatial frequency and high-spatial frequency removing $SiO_2$ particle solution is comprised of a plurality of fumed silica particles.

32. A method as claimed in claim 23, wherein providing a final surface processing solution includes providing a final surface processing mid-spatial frequency and high-spatial frequency removing particle solution with a plurality of particles with surface area in the range of 10 $m^2$/gram to 200 $m^2$/gram.

33. A method as claimed in claim 32, wherein said particles have a surface area in the range of 20 to 110 $m^2$/gram.

34. A method as claimed in claim 23, wherein providing a final surface processing solution includes providing a final surface processing mid-spatial frequency and high-spatial frequency removing particle solution having a pH in the range of 9 to 13.

35. A method as claimed in claim 34, wherein said solution has a pH in the range of 10 to 11.

36. A method as claimed in claim 34, wherein said solution includes potassium hydroxide.

37. A method as claimed in claim 34, wherein said solution includes ammonium hydroxide.

38. A method as claimed in claim 34, wherein said solution includes sodium hydroxide.

39. A method as claimed in claim 23, said method further comprising forming said final finished optical fluoride crystal into a <200 nm laser component.

40. A method as claimed in claim 23, said method further comprising forming said final finished optical fluoride crystal into a <200 nm optical lithography element.

41. A method of making a wavelength λ<200 nm optical calcium fluoride crystal, said method comprising:

providing a calcium fluoride crystal preform, said preform having a first and second initial finished optical transmission surfaces, said initial finished surfaces having a ≦50 angstrom RMS surface roughness with an initial finished mid-spatial frequency roughness 1–1000 μm spatial wavelengths and an initial finished high-spatial frequency roughness<1 μm spatial wavelengths, said initial finished calcium fluoride preform having a low initial finish λ<200 nm transmission LT (%/cm);

providing a final polishing mid-spatial frequency and high-spatial frequency removing colloidal $SiO_2$ particle solution, said mid-spatial frequency and high-spatial frequency removing solution having a pH≧9 and a plurality of colloidal $SiO_2$ particles, said particles having a mean particle size in the range from 20 to 300 nm, final polishing said initial finished surfaces with said mid-spatial frequency and high-spatial frequency removing solution into a first and a second final polished calcium fluoride optical transmission surfaces with said mid-spatial frequency and high-spatial frequency removing solution removing said initial finished spatial frequency spatial wavelengths to provide a final finished optical calcium fluoride crystal having final finish high optical transmission surfaces with a λ<200 nm high transmission HT (%/cm), with HT>LT, transmitting a final use wavelength λ<200 nm light beam through said final finish high optical transmission surfaces to provide a qualifying optical transmission measurement for said wavelength λ<200 nm.

42. A method as claimed in claim 41, wherein providing an optical fluoride crystal preform includes providing a preform with a low initial finish transmission LT at 193 nm and removing said mid-spatial frequency roughness 1–1000 μm spatial wavelengths and said high-spatial frequency roughness<1 μm spatial wavelengths to provide a final finished optical fluoride crystal having a high transmission HT at 193 nm with HT-LT>1 (%/cm @ 193 nm).

43. A method as claimed in claim 41, wherein providing an optical fluoride crystal preform includes providing a calcium fluoride crystal preform with a low initial finish transmission LT at 193 nm with LT>90%/cm @ 193 nm.

44. A method as claimed in claim 41, wherein providing an optical fluoride crystal preform includes providing an optical fluoride crystal preform with said initial finished surfaces having a ≦20 angstrom RMS surface roughness.

45. A method as claimed in claim 41, wherein said mid-spatial frequency and high-spatial frequency removing particle solution is comprised of a plurality of fused silica soot particles.

46. A method as claimed in claim 41, wherein said mid-spatial frequency and high-spatial frequency removing particle solution is comprised of a plurality of fumed silica particles.

47. A method as claimed in claim 41, wherein said mid-spatial frequency and high-spatial frequency removing particle solution is comprised of a plurality of precipitated silica particles.

48. A method as claimed in claim 41, wherein providing a final surface processing solution includes providing a final surface processing mid-spatial frequency and high-spatial frequency removing particle solution with a plurality of particles with surface area in the range of 10 $m^2$/gram to 200 $m^2$/gram.

49. A method as claimed in claim 48, wherein said particles have a surface area in the range of 20 to 110 $m^2$/gram.

50. A method as claimed in claim 41, wherein providing a final surface processing solution includes providing a final surface processing mid-spatial frequency and high-spatial frequency removing particle solution having a pH in the range of 9 to 13.

51. A method as claimed in claim 50, wherein said solution has a pH in the range of 10 to 11.

52. A method as claimed in claim 50, wherein said solution includes potassium hydroxide.

53. A method as claimed in claim 50, wherein said solution includes ammonium hydroxide.

54. A method as claimed in claim 50, wherein said solution includes sodium hydroxide.

55. A method as claimed in claim 41, said method further comprising forming said final finished optical fluoride crystal into a <200 nm laser component.

56. A method as claimed in claim 41, said method further comprising forming said final finished optical fluoride crystal into a <200 nm optical lithography element.

57. A method of making a wavelength λ<200 nm optical calcium fluoride crystal, said method comprising:

providing a calcium fluoride crystal preform, said preform having a first and a second initial finished optical transmission surfaces, said initial finished surfaces having a ≦20 angstrom RMS surface roughness with a plurality of initial finished mid-spatial frequency roughness 1–1000 μm spatial wavelengths and initial finished high-spatial frequency roughness<1 μm spatial wavelengths, said initial finished calcium fluoride preform having a low initial finish λ<200 nm transmission LT (%/cm);

providing a final polishing mid-spatial frequency and high-spatial frequency spatial wavelength removing colloidal particle solution, said mid-spatial frequency and high-spatial frequency spatial wavelengths removing solution having a pH≧9 and a plurality of colloidal particles, final polishing said initial finished surfaces with said mid-spatial frequency and high-spatial frequency spatial wavelength removing solution into a first and a second final polished calcium fluoride optical transmission surfaces with said mid-spatial frequency and high-spatial frequency spatial wavelength removing solution removing said initial finished spatial frequency spatial wavelengths to provide a final finished optical calcium fluoride crystal having final finish high optical transmission surfaces free of said mid-spatial frequency roughness 1–1000 μm spatial wavelengths and said high-spatial frequency roughness<1 μm spatial wavelengths with a λ<200 nm high transmission HT (%/cm), with HT>LT, transmitting a final use wavelength λ<200 nm light through said final finish high optical transmission surfaces.

58. A method of making a wavelength λ<200 nm optical fluoride crystal, said method comprising:

providing a fluoride crystal preform, said preform having a first and a second initial finished optical transmission surfaces, said initial finished surfaces having a ≦20 angstrom RMS surface roughness with a plurality of initial finished mid-spatial frequency roughness 1–1000 μm spatial wavelengths and initial finished high-spatial frequency roughness<1 μm spatial wavelengths, said initial finished fluoride preform having a low initial finish λ<200 nm transmission LT (%/cm);

providing a final polishing mid-spatial frequency and high-spatial frequency spatial wavelength removing colloidal particle solution, said mid-spatial frequency and high-spatial frequency spatial wavelengths removing solution having a pH≧9 and a plurality of colloidal particles, final polishing said initial finished surfaces with said mid-spatial frequency and high-spatial frequency spatial wavelength removing solution into a first and a second final polished fluoride optical transmission surfaces with said mid-spatial frequency and high-spatial frequency spatial wavelength removing solution removing said initial finished spatial frequency spatial wavelengths to provide a final finished optical fluoride crystal having final finish high optical transmission surfaces free of said mid-spatial frequency roughness 1–1000 μm spatial wavelengths and said high-spatial frequency roughness<1 μm spatial wavelengths with a λ<200 nm high transmission HT (%/cm), with HT>LT, transmitting a final use wavelength λ<200 nm light through said final finish high optical transmission surfaces.

* * * * *